Nov. 21, 1933.  C. E. BRANICK  1,935,937
DROP CENTER WHEEL HOLDER
Filed June 2, 1932  2 Sheets-Sheet 1
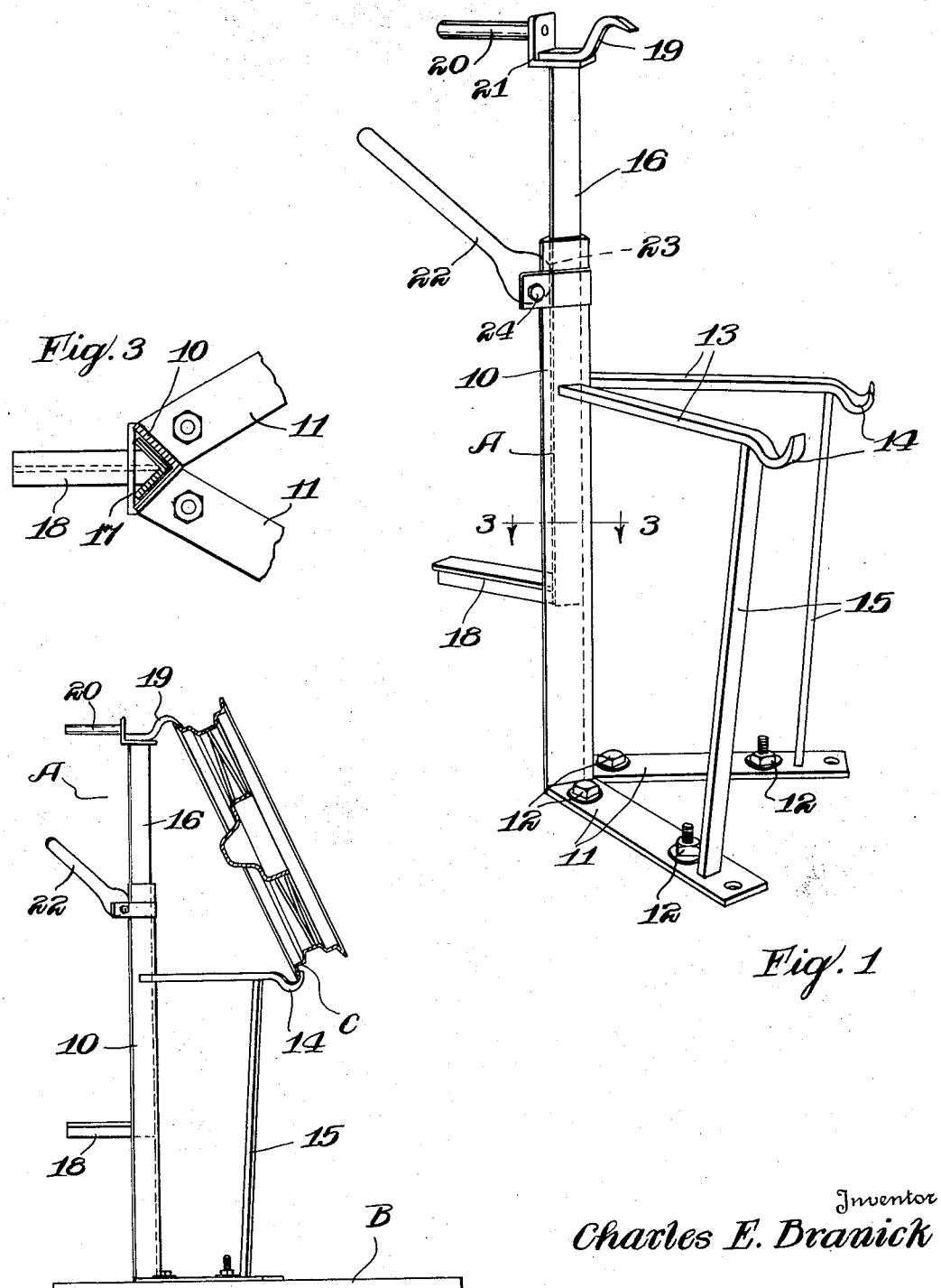
Inventor
Charles E. Branick
By
Attorney Inventor
Charles E. Branick Patented Nov. 21, 1933

1,935,937

UNITED STATES PATENT OFFICE 1,935,937

DROP CENTER WHEEL HOLDER

Charles E. Branick, Fargo, N. Dak.

Application June 2, 1932. Serial No. 614,950

9 Claims. (Cl. 144—288)

My invention relates to drop center wheel holders wherein it is desired to hold and support an automobile wheel having a particular construction known as "drop center" to hold the wheel in a position to permit the tire casing to be readily removed and replaced on the wheel held by the holder.

In a drop center wheel there is no rim which may be removed from the rim of the wheel to permit the tire casing to be disengaged therefrom. When the tire is deflated in a wheel of this character it is necessary to insert tools under the bead of the casing and pry the tire casing off of the wheel. This may readily be done, but it is difficult to hold the wheel stationary and without marring or injuring the same while removing the tire. My holder has an extremely simple construction and provides a means of holding the drop center wheel perfectly rigid while the tire is removed therefrom.

A feature resides in a holder made of angular members connected together having base portions extending from a standard and being adapted to be bolted or secured to the floor to hold the wheel holder rigid, or the wheel holder may be bolted to a base plate so that it may be portable if it is desired. The operator can stand on the base plate when the holder is of a portable nature so that the weight of the operator will hold the holder stationary while operating the same.

A feature of my holder resides in a pair of rim rests which are rigidly supported from a main standard and have arm portions extending radially therefrom while suitable bracket portions extend to the floor plate or arms which also extend radially from the main standard. The main standard may be in the form of an angular member which is adapted to support a second angular member telescopically slidable in the first standard member so as to adjust the second angular member into the desired position. One of these angular members forms the lower portion of the standard and is held rigid with the base. The other angular member forms the upper part of the standard and is adjustable in relation to the wheel engaging rim members which extend radially from the standard. By adjusting the upper end of the standard into the desired position the holder may be quickly adjusted to any size wheel.

My holder is particularly designed for drop center wheels and is constructed so as to support the wheel at an inclined angle, the lower portion resting in the radially disposed arms while the upper portion is held tilted back at a single point by means of the adjustable standard. With the drop center wheel in this position a tire may be easily pried off of the same or replaced on the wheel when it is desired.

These features together with other details and objects will be more fully and clearly hereinafter set forth.

In the drawings forming part of this specification:

Figure 1 is a perspective view of my drop center wheel holder.

Figure 2 is a side view of the same, showing a drop center wheel held thereon.

Figure 3 is a section on the line 3—3 of Figure 1.

Figure 4:
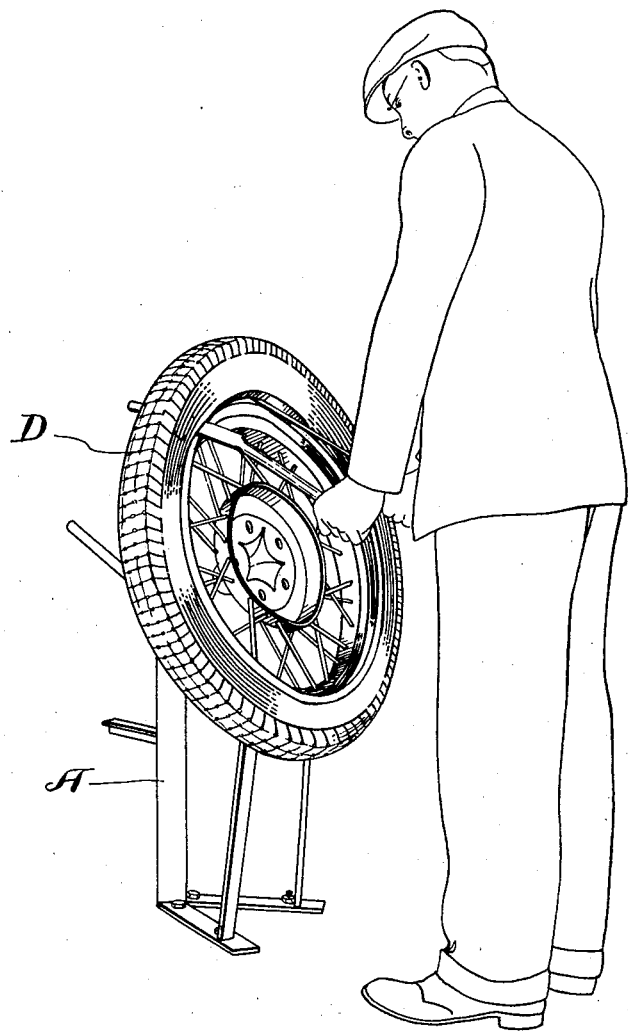
Figure 4 is a perspective view illustrating the use and operation of my wheel holder.

The drop center wheel holder A is formed with an angle iron main standard 10 which is rigidly secured on one end to the base plates 11. These base plates may be of any form or construction and may extend radially as illustrated in Figure 1, where they are made of two separate members. The base plates 11 are adapted to be bolted by the bolts 12 to the floor or to a baseboard such as B, illustrated in Figure 2, if it is desired, to provide a portable construction for my drop center wheel holder. Where the standard 10 is made of angle iron as illustrated, the base plates 11 can extend out from either side of this angle iron standard being rigidly secured thereto at the lower extremity.

Projecting from the sides of the standard 10 and spaced from the base or floor plates 11 I provide radially extending wheel rim rest arms 13 formed with wheel rim engaging hooks 14 on the outer free ends. These arms are secured rigidly at their free ends to the standards 10. Just inside of the hook ends 14 I provide a bracket arm 15 for each of the arms 13 which is secured just inside of the hook ends 14 rigidly to the arms 13 and which extends down to and is rigidly secured to the base plates 11. Thus the bracket arms 15 form a rigid support for the radially forwardly extending arms 13. In this manner the arms 13 are adapted to form a rest for the rim of the wheel C, as illustrated in Figure 2.

Within the standard 13 I slidably position the upper standard member 16 which is held in place by the cross bars 17 extending across the back of the main standard 10 so as to hold the upper standard 16 slidable in the lower standard portion 10. At the lower end of the upper standard portion 16 I provide a foot rest 18 which is adapted to assist in pressing the standard 16 down in a manner to cause the hook 19 on the upper end of the same to engage firmly with the top of the rim of the wheel C in clamping a wheel C in the position illustrated in Figure 2 in the holder A. A hand lever 20 is secured to the head portion 21 which supports the upper hook 19 on the standard 16 so as to direct the operation of the hook 19 in engaging with the drop center wheel C. When the upper standard 16 has been adjusted to the size of the rim of the wheel C and the foot lever or rest 18 has been pressed down firmly so as to clamp the wheels C between the supporting hooks 19, a suitable cam lever 22 which is formed with a cam 23 and which is pivotally secured at 24 to the lower standard 10, as illustrated, is adapted to be operated to clamp the upper standard 16 rigidly to the lower standard 10. Thus the drop center wheel C will be held angularly disposed as illustrated in Figure 2 with the lower portion extending outward and the upper portion backward toward the upper standard 16. This holds the wheel C in a rather reclining position with the top away from the operator. In this position the operator is free to insert suitable tire casing removing tools between the rim of the wheel C and the bead of the casing, as illustrated in Figure 4, permitting the operator to use both hands freely in the removal of the tire casing D.

The advantages of the use of my drop center wheel holder will be quite apparent as it will be observed from Figure 4 that the operator does not have to hold the wheel C rigid while endeavoring to remove the casing. Neither does the operator find it necessary to stand or kneel upon the wheel while either removing the casing or applying it. My drop center wheel holder holds the wheel up in a convenient position where the operator can stand almost erect and have more force and power to remove the casing than where the wheel is free to move about, and yet the construction of the holder is so simple and inexpensive that it may be easily accessible to those desiring to use the same. The holder does not have any complicated or intricate parts. I have found my holder to permit the operator to more quickly remove the tire casing and to do it in a manner so as not to injure the finish on the wheel.

The holder A may be made so that it may be assembled in a comparatively flat package so as to be stored away or so as to be carried in an automobile if it is desired. However, for use in tire shops it may be preferred to have it made up of a rigid formation owing to the simple construction thereof.

In accordance with the patent statutes I have described the principles of my drop center wheel holder and I desire to represent the best embodiment thereof in the illustrations, however, it is apparent that these may be varied and may be applied by other means and carried out in other formation and for uses for which they are adapted within the scope of the following claims.

I claim:

1. A drop center wheel holder including, a main adjustable standard having a lower rigid standard portion, an upper standard portion slidable into the desired adjustment, a hook on the upper standard portion for engaging a wheel rim, a hook means projecting from the lower standard and rigidly associated therewith for engaging a wheel rim, and means for locking said standards together to clamp a drop center wheel in angular position between said hook means of said standard to permit the easy removal and attachment of a tire casing to the wheel.

2. A drop center wheel holder including, an angle iron standard, a base for supporting said standard, a pair of radially disposed hook ended wheel supporting arms projecting from said standard, means for bracing said arms, an angle iron upper standard, means for adjustably locking said upper standard to said lower standard, and a hook end formed on said upper standard, said hook ended arms and said upper hook on said standard being adapted to support a drop center wheel by a three-point suspension to permit the easy removal and application of a tire casing thereto.

3. A drop center wheel holder including, an adjustable standard having a rim engaging hook on the upper end thereof, a cam clamp for clamping said standard into adjusted position to the size of a wheel rim, and hook bracket means adapted to co-operate with said upper hook to support a drop-center wheel therebetween to permit rigid holding of the wheel while a tire casing is removed or attached thereto.

4. A drop center wheel holder including, an adjustable standard, a base for supporting said standard, rim engaging hook means, rigidly supported in relation to said standard, and forwardly projecting therefrom, a rim engaging hook end formed on said adjustable standard, a foot urged means for forcing said hook on said standard to engage tightly with the rim of a wheel supported by said first hook means, and a clamp for securing said adjustable standard in adjusted position to rigidly support a drop center wheel in a manner to permit a tire to be easily removed therefrom while the wheel is held against movement.

5. A drop center wheel clamp including, an extendible standard, a wheel engaging hook means on the upper end of said standard, a foot adjustment on the lower end of said upper portion of said standard, to force said hook into tight engagement with the wheel rim, means for clamping said standard in an adjusted position when fitted to the wheel rim, and a wheel rim hook rest adapted to co-operate with the hook on the upper end of said standard to clamp a drop center wheel therebetween, holding the same rigid against movement for the removal or application of a tire casing thereto.

6. A drop center wheel holder including, an angle iron lower standard member, an angle iron upper standard member slidable in said lower standard member, a cam means for clamping said upper and lower standard members in adjusted position, cradle rim supporting arms having rim hooks for engaging the rim of a wheel rigidly secured in relation to said lower standard, and a rim hook on said upper standard adapted to be brought into engagement with the rim of a wheel when the same is resting in said cradle hooks to support the wheel disposed in a manner to facilitate easy removal or application of a tire casing thereto.

7. A drop center wheel holder including, a frame having a base portion, cradle hooks formed in said frame into which the rim of a drop center wheel may rest, an adjustable clamping member slidable in said frame having a rim hook for engaging the rim of the wheel to clamp the same between said hook and said cradle hooks, and foot urged means on said slidable clamping member for forcing the rim of the wheel into firm engagement with said cradle hook to adjust the holder to the size of the wheel rim and hold the same rigid while clamped thereto.

8. A wheel holder including, a base, a standard extending upwardly therefrom, rim engaging means secured to said standard, an extension on said standard, a clamping hook on said extension, and clamping means for holding said extension clamped in definite relationship to said standard.

9. A wheel holder including, a base, an extendible two part standard, one part of which is secured to said base, rim engaging members on each part of said standard, and clamping means for holding the parts of said standard extended to a desired length.

CHARLES E. BRANICK.